US010458129B1

(12) United States Patent  
Wedekind et al.

(10) Patent No.: US 10,458,129 B1  
(45) Date of Patent: Oct. 29, 2019

(54) DRYWALL BANJO TOOLS FOR APPLYING JOINT TYPE

(71) Applicant: The Advance Equipment Manufacturing Company, Chicago, IL (US)

(72) Inventors: John Wedekind, Chicago, IL (US); Duane Huber, Chicago, IL (US); Richard Eisfeller, II, Chicago, IL (US)

(73) Assignee: THE ADVANCE EQUIPMENT MANUFACTURING COMPANY, Chicago, IL (US)

( * ) Notice: Subject to any disclaimer, the term of this patent is extended or adjusted under 35 U.S.C. 154(b) by 0 days.

(21) Appl. No.: 15/993,347

(22) Filed: May 30, 2018

(51) Int. Cl.  
*B32B 43/00* (2006.01)  
*E04F 21/165* (2006.01)  
(Continued)

(52) U.S. Cl.  
CPC ..... *E04F 21/1655* (2013.01); *B65H 35/0033* (2013.01); *B65H 35/0073* (2013.01); *E04F 21/1657* (2013.01); *B29C 66/861* (2013.01); *B44C 7/02* (2013.01); *B44C 7/04* (2013.01); *B44C 7/06* (2013.01); *B44C 7/08* (2013.01); *B65H 35/004* (2013.01); *B65H 35/0046* (2013.01); *B65H 35/0053* (2013.01);  
(Continued)

(58) Field of Classification Search  
CPC .......... B29C 66/861; B44C 7/02; B44C 7/04; B44C 7/06; B44C 7/08; B65H 35/0033; B65H 35/004; B65H 35/0046; B65H 35/0053; B65H 35/007; B65H 37/007; E04F 21/1657; Y10T 156/1788; Y10T 156/179; Y10T 156/1795; Y10T 156/1797; Y10T 156/18

USPC .................. 156/524, 574, 575, 577, 579, 71  
See application file for complete search history.

(56) References Cited

U.S. PATENT DOCUMENTS 2,328,571 A  9/1943  Meyer  
3,707,427 A  12/1972  Erickson  
(Continued)

OTHER PUBLICATIONS

Can-Am Tool Corp, "Two Wheel Inside Corner Roller." Retrieved May 22, 2018 from http://www.canamtool.com/products/corner-rollers/two-wheel-inside-corner-roller.  
(Continued)

*Primary Examiner* — Mark A Osele  
*Assistant Examiner* — Nickolas R Harm  
(74) *Attorney, Agent, or Firm* — James P. Muraff; Neal, Gerber & Eisenberg LLP

(57) ABSTRACT

Method and apparatus are disclosed for drywall banjo tools for applying joint tape. An example tool for applying joint tape includes a base configured to couple to a drywall banjo that dispenses the joint tape. The example tool includes an arm including a proximal end and a distal end opposite the proximal end. The proximal end is rotatably coupled to the base to enable the arm to rotate between an extended position and a retracted position. The example tool includes a corner wheel rotatably coupled to the distal end of the arm to enable the corner wheel to apply the joint tape along a corner drywall joint when the arm is in the extended position. The example tool includes side wheels rotatably coupled to the base to enable the side wheels to apply the joint tape along a flat drywall joint when the arm is in the retracted position.

18 Claims, 11 Drawing Sheets

(51) Int. Cl.
*B65H 35/00* (2006.01)
*B29C 65/00* (2006.01)
*B65H 37/00* (2006.01)
*B44C 7/02* (2006.01)
*B44C 7/06* (2006.01)
*B44C 7/08* (2006.01)
*B44C 7/04* (2006.01)

(52) U.S. Cl.
CPC .. *B65H 37/007* (2013.01); *B65H 2701/11332* (2013.01); *Y10T 156/179* (2015.01); *Y10T 156/1788* (2015.01); *Y10T 156/1795* (2015.01); *Y10T 156/18* (2015.01)

(56) References Cited

U.S. PATENT DOCUMENTS

| | | | | |
|---|---|---|---|---|
| 3,880,701 A | * | 4/1975 | Moree | B44C 7/04 156/526 |
| 4,003,781 A | * | 1/1977 | Holsten | E04F 21/165 156/526 |
| 4,080,240 A | * | 3/1978 | Dysart | B44C 7/06 156/575 |
| 4,086,121 A | * | 4/1978 | Ames | B44C 7/06 156/526 |
| 4,090,914 A | * | 5/1978 | Hauk | B65H 35/0046 118/108 |
| 4,197,624 A | | 4/1980 | Lass | |
| 4,208,239 A | * | 6/1980 | Lass | B44C 7/06 156/575 |
| 4,358,337 A | * | 11/1982 | Johnson | B05C 17/01 156/524 |
| 4,451,223 A | | 5/1984 | Mower et al. | |
| 4,452,663 A | * | 6/1984 | Heaton | B44C 7/06 156/575 |
| 4,689,107 A | | 8/1987 | Entwistle | |
| 4,707,202 A | | 11/1987 | Sweeny | |
| 5,114,527 A | * | 5/1992 | Stern | B44C 7/04 118/413 |
| 5,137,752 A | | 8/1992 | Mills | |
| 5,814,184 A | * | 9/1998 | Denkins | B65H 35/0033 156/577 |
| 6,209,609 B1 | | 4/2001 | Edwards et al. | |
| 6,367,534 B1 | | 4/2002 | Mcglenn | |
| 6,668,897 B2 | | 12/2003 | Gunn | |
| 7,621,309 B1 | * | 11/2009 | Mondloch | B44C 7/06 156/526 |
| 8,863,807 B2 | * | 10/2014 | Jungklaus | B65H 35/0053 156/575 |
| 8,955,573 B2 | | 2/2015 | Owens et al. | |
| 2003/0066611 A1 | | 4/2003 | Gunn | |
| 2004/0211525 A1 | * | 10/2004 | Boutin | B44C 7/06 156/577 |
| 2005/0055981 A1 | * | 3/2005 | Smythe | E04F 21/165 52/749.1 |
| 2009/0094936 A1 | | 4/2009 | Brown | |
| 2013/0192765 A1 | * | 8/2013 | Owens | E04F 21/00 156/433 |
| 2016/0279919 A1 | | 9/2016 | Jungklaus et al. | |
| 2016/0356049 A1 | | 12/2016 | Potter | |

OTHER PUBLICATIONS

International Search Report and Written Opinion for PCT/US2019/034666 dated Aug. 16, 2019.
International Search Report and Written Opinion for PCT/US2019/034646 dated Aug. 2, 2019.

* cited by examiner

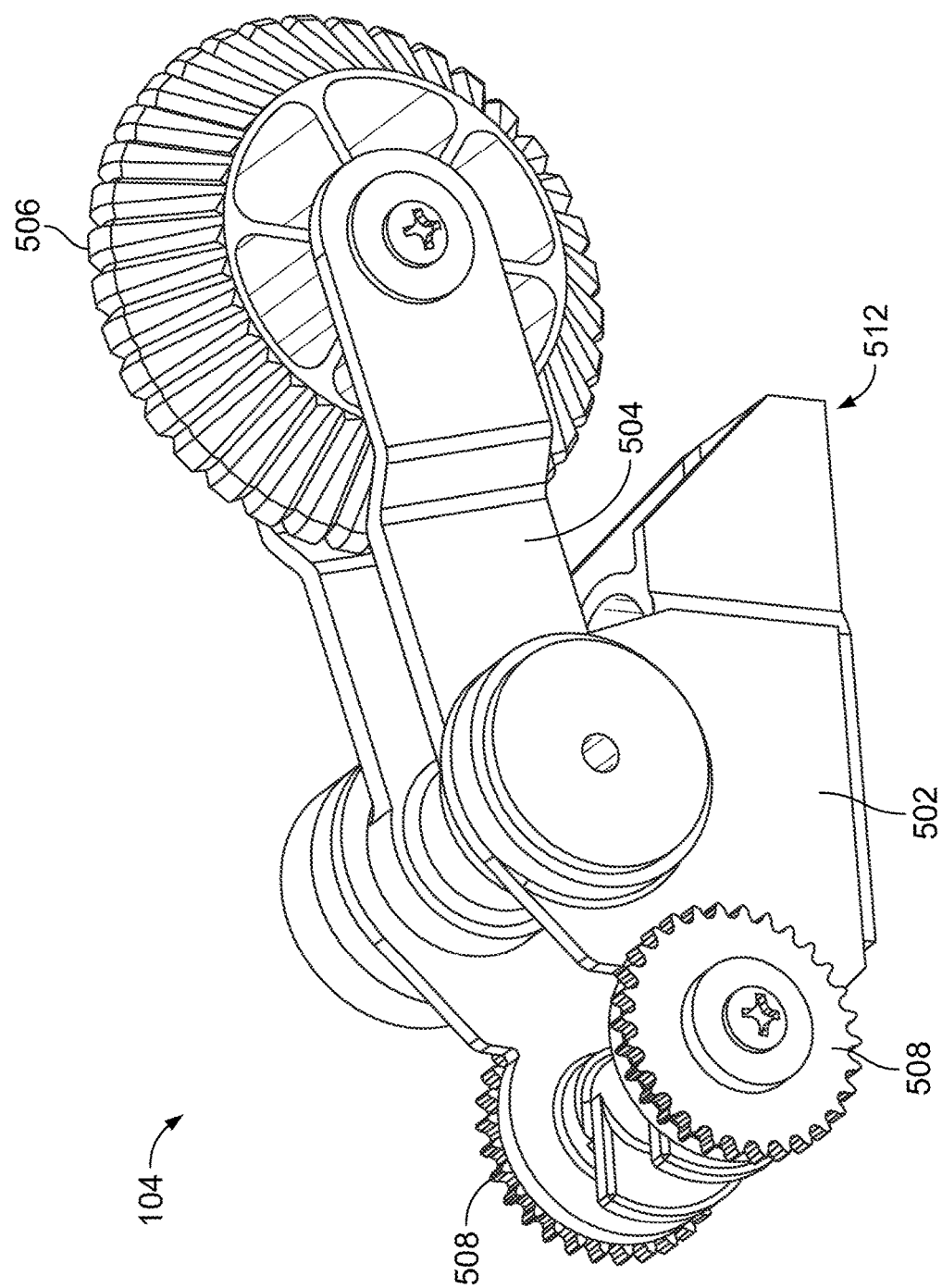

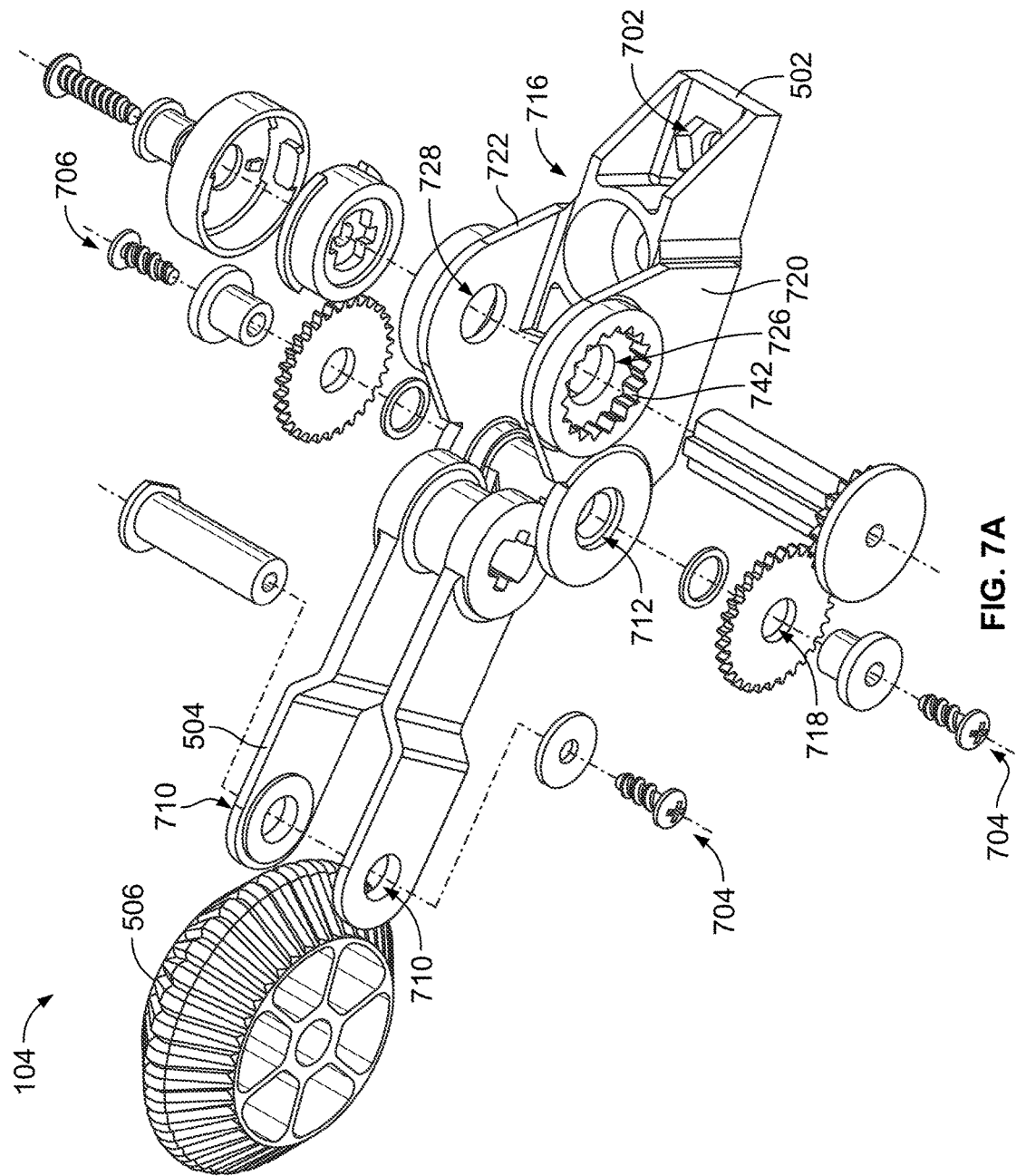

DRYWALL BANJO TOOLS FOR APPLYING JOINT TYPE

CROSS-REFERENCE TO RELATED APPLICATIONS

This application is related to U.S. application Ser. No. 15/993,374, filed on May 30, 2018, and U.S. application Ser. No. 15/993,383, filed on May 30, 2018, which are incorporated herein by reference in their entireties.

TECHNICAL FIELD

The present disclosure generally relates to drywall and, more specifically, to drywall banjo tools for applying joint tape.

BACKGROUND

Oftentimes, drywall is used when constructing walls within a building. For instance, drywall may be used when constructing walls to reduce construction time costs; define channels for insulation, plumbing, and electric wires; increase sound proofing of the walls; increases fire resistance of the walls; etc. Drywall is typically in the form of a panel made of gypsum (i.e., calcium sulfate dihydrate), a fiber material (e.g., paper, fiberglass, etc.), and/or other material. Oftentimes, when forming a wall, panels of drywall are arranged in a side-by-side manner such that joints are formed between the panels of drywall. These joints are typically filled in with joint compound along a surface of the wall formed by the drywall. In some instances, a drywall banjo is used to apply the joint compound to the joints between the drywall panels. A drywall banjo is a device that dispenses tape with one side coated with joint compound. A user applies the dispensed tape along the joints formed between the panels to cause the joint compound coating the tape to be applied to the joints.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for drywall banjo apparatus for applying joint tape. An example disclosed tool for applying joint tape to drywall includes a base configured to couple to a drywall banjo that dispenses the joint tape. The example disclosed tool also includes an arm including a proximal end and a distal end opposite the proximal end. The proximal end is rotatably coupled to the base to enable the arm to rotate between an extended position and a retracted position. The example disclosed tool also includes a corner wheel rotatably coupled to the distal end of the arm to enable the corner wheel to apply the joint tape along a corner drywall joint when the arm is in the extended position. The example disclosed tool also includes side wheels rotatably coupled to the base to enable the side wheels to apply the joint tape along a flat drywall joint when the arm is in the retracted position.

In some examples, the arm is rotatably coupled to the base about a first axis and the side wheels are rotatably coupled to the base about a second axis that is parallel to and offset from the first axis. In some such examples, the corner wheel is rotatably coupled to the arm about a third axis that is parallel to and offset from the first axis.

In some examples, an outer surface of the corner wheel includes ribs to facilitate the corner wheel in gripping the joint tape. In some such examples, a vertex of the outer surface is rounded to deter the corner wheel from puncturing the joint tape. In some examples, the side wheels include teeth to facilitate the side wheels in gripping the joint tape. In some examples, each of the side wheels are coupled to the base via a respective axle assembly.

In some examples, the base includes a first end to which the side wheels are coupled and a second end that is configured to couple to the drywall banjo. In some such examples, a portion of the first end is rounded to facilitate the joint tape in being fed to the side wheels from the drywall banjo without tearing. In some such examples, the corner wheel is to extend beyond the side wheels at the first end when the arm is in the extended position. Further, in some such examples, the corner wheel is to extend beyond the second end away from the side wheels when the arm is in the retracted position.

In some examples, the arm is coupled to the body via an axle assembly. In some such examples, the axle assembly includes a keyed shaft and an end cap. The keyed shaft extends through a keyed aperture of the arm to fixedly couple the arm to the keyed shaft. The keyed shaft extends through apertures defined by the base, extends through the keyed aperture defined the arm, and is received by the end cap to rotatably couple the arm to the base. Further, in some such examples, the keyed shaft includes a flange with external teeth and one of the apertures defined by the base includes internal teeth that are configured to receive the external teeth of the flange to adjust and set a position of the arm relative to the base. Moreover, in some such examples, the axle assembly includes an end cap cover. The end cap cover couples to the end cap to prevent the keyed shaft is prevented from rotating relative to the base. The end cap cover decouples from the end cap to enable the keyed shaft to be rotated relative to the base.

An example disclosed tool for applying joint tape to drywall includes a base configured to couple to a drywall banjo that dispenses the joint tape. The example disclosed tool also includes an arm including a proximal end and a distal end opposite the proximal end. The proximal end is configured to rotatably couple to the base to enable the arm to rotate between an extended position and a retracted position. The example disclosed tool also includes a corner wheel configured to rotatably couple to the distal end of the arm to enable the corner wheel to apply the joint tape along a corner drywall joint when the arm is in the extended position. The example disclosed tool also includes side wheels configured to rotatably couple to the base to enable the side wheels to apply the joint tape along a flat drywall joint when the arm is in the retracted position.

In some examples, the arm is configured to rotatably couple to the base about a first axis and the side wheels are configured to rotatably couple to the base about a second axis that is parallel to and offset from the first axis. In some examples, the corner wheel is to extend beyond the side wheels when the arm is in the extended position. In some examples, the corner wheel is to extend away from the side wheels when the arm is in the retracted position.

An example disclosed drywall banjo apparatus for applying joint tape includes a banjo body and an applicator tool. The applicator tool includes a base coupled to the banjo body. The applicator tool also includes an arm including a proximal end and a distal end opposite the proximal end. The proximal end is configured to rotatably couple to the base to enable the arm to rotate between an extended position and a retracted position. The applicator tool also includes a corner wheel configured to rotatably couple to the distal end of the arm to enable the corner wheel to apply the joint tape along a corner drywall joint when the arm is in the extended position. The applicator tool also includes side wheels configured to rotatably couple to the base. The side wheels are configured to apply the joint tape along a flat drywall joint when the arm is in the retracted position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views. Moreover, as used herein, stating that any component is positioned on another component indicates that (i) the former component is in contact with the latter component or (ii) one or more intermediate component(s) are located between the former component and latter component. Stating that any component is in contact with another component indicates that there is no intermediate component between the former component and latter component.

FIG. 6 illustrates the applicator tool FIGS. 5A and 5B in a retracted position.

FIGS. 7A and 7B depict exploded views of the applicator tool of FIGS. 5A and 5B.

DETAILED DESCRIPTION OF EXAMPLE EMBODIMENTS

Figure 1:
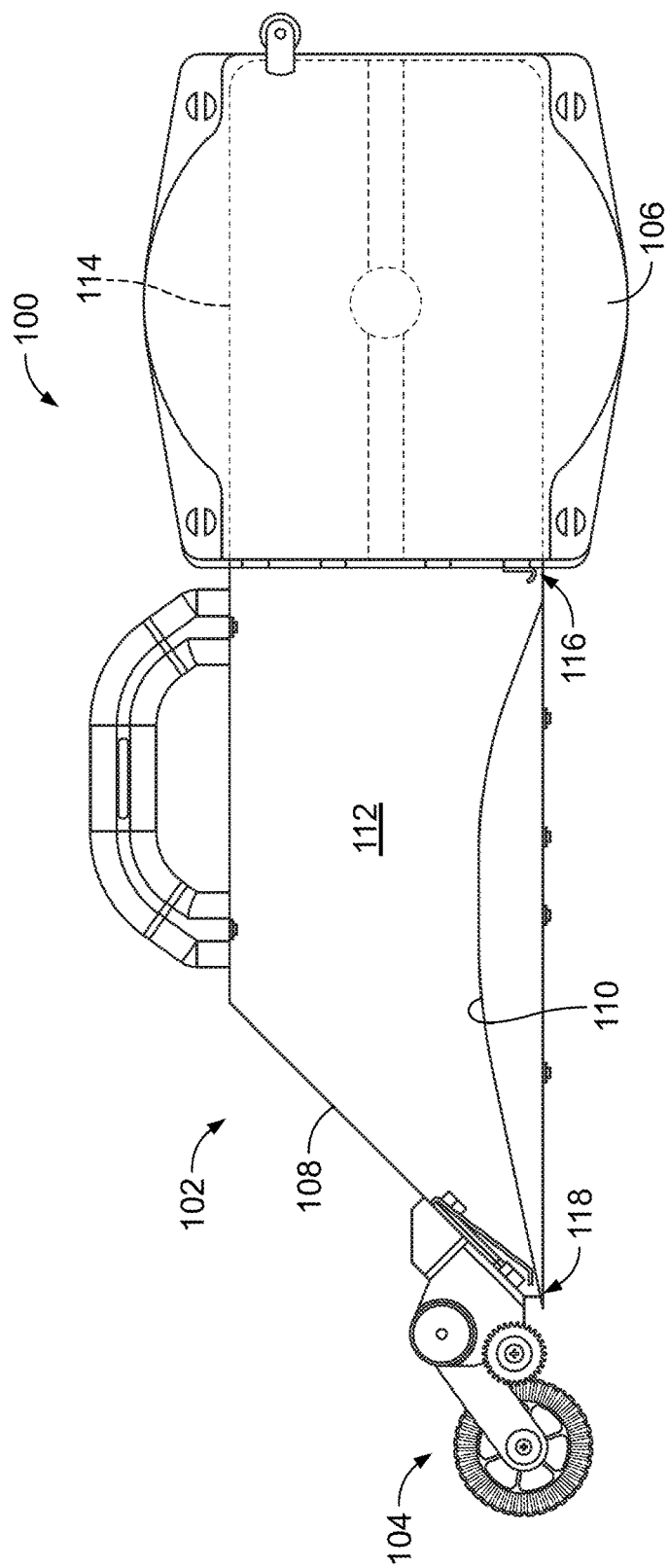
FIG. 1 illustrates an example banjo assembly in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, drywall is used when constructing walls within a building. For instance, drywall may be used when constructing walls to reduce construction time costs; define channels for insulation, plumbing, and electric wires; increase sound proofing of the walls; increases fire resistance of the walls; etc. Drywall is typically in the form of a panel made of gypsum (i.e., calcium sulfate dihydrate), a fiber material (e.g., paper, fiberglass, etc.), and/or other material. Oftentimes, when forming a wall, panels of drywall are arranged in a side-by-side manner such that joints are formed between the panels of drywall. These joints are typically filled in with joint compound along a surface of the wall formed by the drywall. In some instances, a drywall banjo is used to apply the joint compound to the joints between the drywall panels. A drywall banjo is a device that dispenses tape with one side coated with joint compound. A user applies the dispensed tape along the joints formed between the panels to cause the joint compound coating the tape to be applied to the joints.

In some instances, joint compound potentially may not be uniformly applied to tape before the tape is dispensed by a drywall banjo along a drywall joint. In turn, the drywall joint potentially may not be uniformly coated with the joint compound via the dispensed tape. Example apparatus disclosed herein include a sloped mound positioned within a cavity of a drywall banjo. The sloped mound causes joint compound contained within the cavity to flow toward tape sliding through the cavity to ensure that the tape being dispensed by the drywall banjo is uniformly coated with the joint compound.

Further, in some instances panels of drywall are arranged to form a corner. For instance, two panels are drywall may be arranged to form a right angle. In such instances, it potentially may be difficult to apply tape coated with joint compound to both of the panels of drywall forming a corner joint. Example apparatus disclosed herein include a wheel that is configured to enable a user to simultaneously apply tape dispensed by a drywall banjo to both panels of drywall forming a corner joint as the wheel is rolled along the corner joint.

Turning to the figures, FIG. 1 illustrates an example banjo assembly 100 in accordance with the teachings herein. As illustrated in FIG. 1, the banjo assembly 100 includes a drywall banjo 102 (also referred to as a tape banjo, a drywall tape banjo, a taping banjo, a banjo taping device, a drywall taping tool, a banjo taper, and a banjo), an applicator tool 104, and a cover 106. The drywall banjo 102 of the illustrated example includes a banjo body 108, a sloped mound 110 (also referred to as a "banjo belly" and a "belly") positioned within a cavity 112 of the banjo body 108, and a tape holder 114. The banjo body 108 is configured to contain joint compound mud (e.g., joint compound mud 402 of FIGS. 4A and 4B) within the cavity 112. The tape holder 114 is configured to house joint tape (e.g., joint tape 404 of FIGS. 4A and 4B) that is to be applied to drywall joints via the banjo assembly 100. In the illustrated example, the cover 106 is coupled to the tape holder 114 to enclose the joint tape (also referred to as drywall tape, drywall joint tape) housed by the tape holder 114.

In operation, the joint tape housed by the tape holder 114 is fed into the cavity 112 of the banjo body 108 via a tape inlet 116 defined by the banjo body 108. While within the cavity 112, the joint tape collects the joint compound mud (also referred to as a drywall joint compound, drywall compound, mud, and joint cement) on one of its sides. The sloped mound 110 is configured to cause the joint compound mud to flow toward the drywall tape. In the illustrated example, the sloped mound is coupled to and/or integrally formed with the banjo body 108. Subsequently, the joint tape is fed out of the cavity 112 of the banjo body 108 to the applicator tool 104 via a tape outlet 118 defined by the banjo body 108. The applicator tool 104 applies the joint tape to a drywall joint to apply the joint compound mud to the drywall joint. Further, the drywall tape is cut from the banjo assembly 100 (e.g., via a knife) to enable the drywall tape to rest on the drywall joint.

Figure 2:
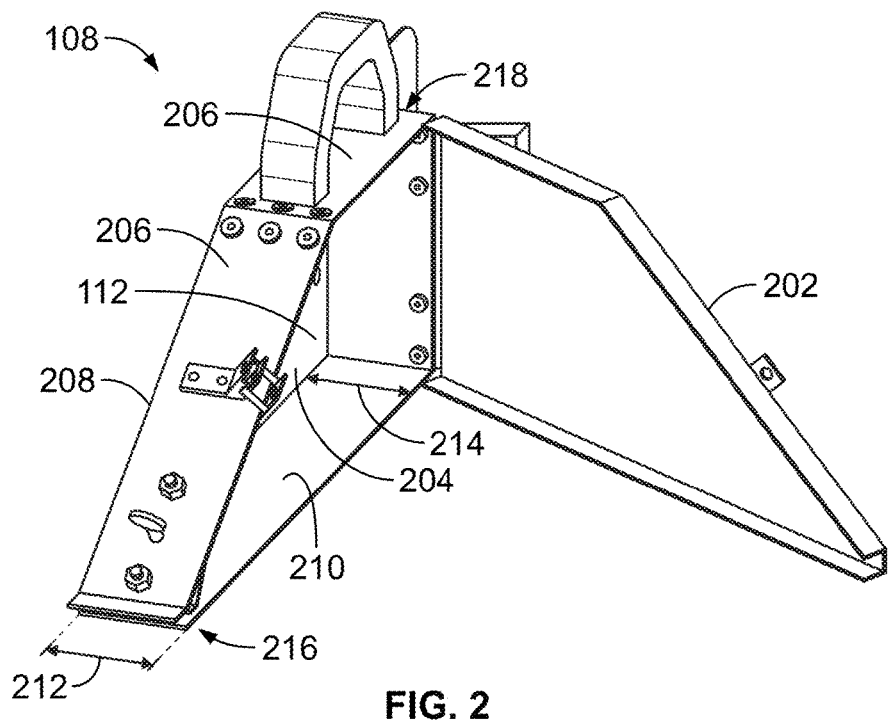
FIG. 2 illustrates a banjo body of the banjo assembly FIG. 1 when opened.

FIG. 2 illustrates the banjo body 108 when a door 202 of the banjo body 108 is opened to provide access to the cavity 112 of the banjo body 108. As illustrated in FIG. 2, the banjo body 108 includes the door 202, a panel 204, and side walls 206. The side walls 206 protrude from outer edges 208 of the panel 204 to define the cavity 112. For example, the side walls 206 include a first side wall 210 that is flat and extends between the tape outlet 118 located at a first end 216 of the banjo body 108 and the tape inlet 116 located at a second end 218 of the banjo body 108. In the illustrated example, the side walls 206 extend from the outer edges 208 in a direction perpendicular to the panel 204 and have a uniform width 212 such that the cavity 112 has a uniform thickness 214 between the panel 204 and the door 202 when the door 202 is in a closed position. That is, the banjo body 108 and the cavity 112 of the illustrated example are substantially right-prism shaped.

The door 202 of the banjo body 108 is configured to couple to the side walls 206 opposite the panel 204 to enclose object(s) (e.g., joint compound mud) within the cavity 112. In the illustrated example, the door 202 is hingedly coupled to one of the side walls 206 via a hinge to enable the door 202 to transition between an open position and a closed position. Further, the banjo body 108 includes a latch coupled to another one of the side walls 206 that is configured to retain the door 202 in the closed position.

Figure 3A:
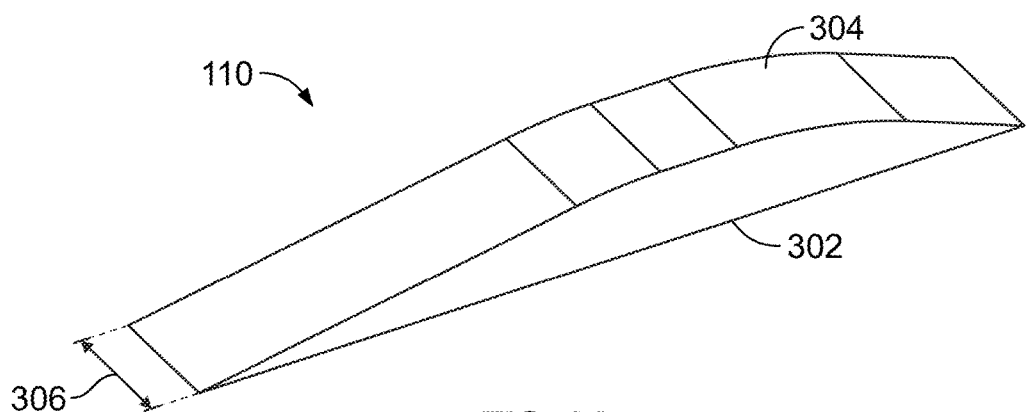
FIG. 3A illustrates an example sloped mound of the banjo assembly FIG. 1 in accordance with the teachings herein.

FIG. 3A illustrates the sloped mound 110 of the banjo assembly 100 in accordance with the teachings herein. As illustrated in FIG. 3A, the sloped mound 110 includes a flat surface 302 and a sloped surface 304 opposite the flat surface 302. The flat surface 302 is configured to engage the first side wall 210 when the sloped mound 110 is coupled to the banjo body 108. Further, the sloped surface 304 of the illustrated example is asymmetrical. When the sloped mound 110 is coupled to the banjo body 108, the sloped surface 304 is configured to guide joint compound mud contained within the cavity 112 toward joint tape that is sliding through the cavity 112. In some examples, the sloped mound 110 is hollow. In other examples, the sloped mound 110 is a solid piece of material. Additionally or alternatively, the sloped mound 110 may be formed of metal, plastic, rubber, and/or any combination thereof.

In the illustrated example, the sloped mound 110 has a uniform width 306 (e.g., of about 2.15 inches). The uniform width 306 of the sloped mound 110 equals and/or is less than the uniform thickness 214 of the cavity 112 to enable the sloped mound 110 to be positioned within the cavity 112 when the door 202 of the banjo body 108 is closed. For example, the uniform width 306 of the sloped mound 110 equals and/or is slightly less than the uniform thickness 214 of the cavity 112 such that the sloped mound 110 extends from the panel 204 to the door 202 when the door 202 is closed.

Figure 3B:
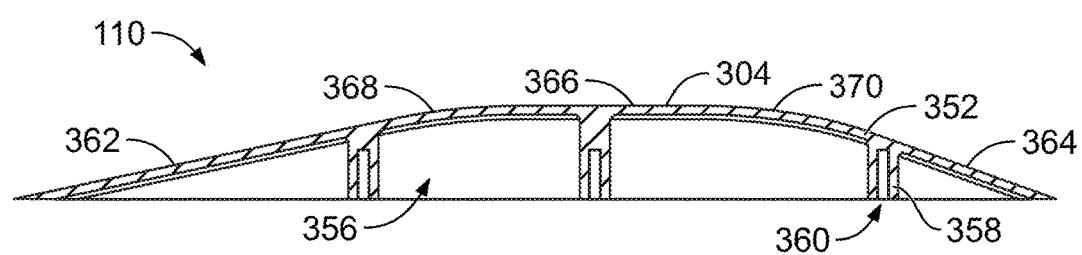
FIG. 3B depicts a cross-section of the sloped mound of FIG. 3A.

FIG. 3B illustrated an example cross-section of the sloped mound 110 in accordance with the teachings herein. As illustrated in FIG. 3B, the sloped mound 110 is hollow. The sloped mound 110 includes a sloped wall 352 and side walls that define a cavity 356. In the illustrated example, walls 358 extend from the sloped wall 352 and/or the side walls into the cavity 356. Each of the walls 358 define an aperture 360 that is configured to receive a fastener (e.g., a fastener 414 of FIG. 4A) to couple the sloped mound 110 to the banjo body 108. In the illustrated example, the sloped mound 110 has a height of about 1.86 inches, a length of about 13.3675 inches, and a width of about 2.15 inches. Further, the sloped wall 352 of the illustrated example has a thickness of about 0.1 inches.

As illustrated in FIG. 3B, the sloped wall 352 of the sloped mound 110 defines a first end surface 362, a second end surface 364, and an intermediate surface 366 of the sloped surface 304. The intermediate surface 366 is located between the first end surface 362 and the second end surface 364. Further, the sloped wall 352 of the sloped mound 110 defines a first transition surface 368 and a second transition surface 370. The first transition surface 368 extends between the first end surface 362 and the intermediate surface 366, and the second transition surface 370 extends between the second end surface 364 and the intermediate surface 366. In the illustrated example, the intermediate surface 366 is flat and is substantially parallel to the flat surface 302. The first end surface 362 is flat and has a slope of about 12 degrees, and the second end surface 364 is flat and has a slope of about 20 degrees. Further, each of the first transition surface 368 and the second transition surface 370 is rounded and has a radius of about 3 inches.

Figure 4A:
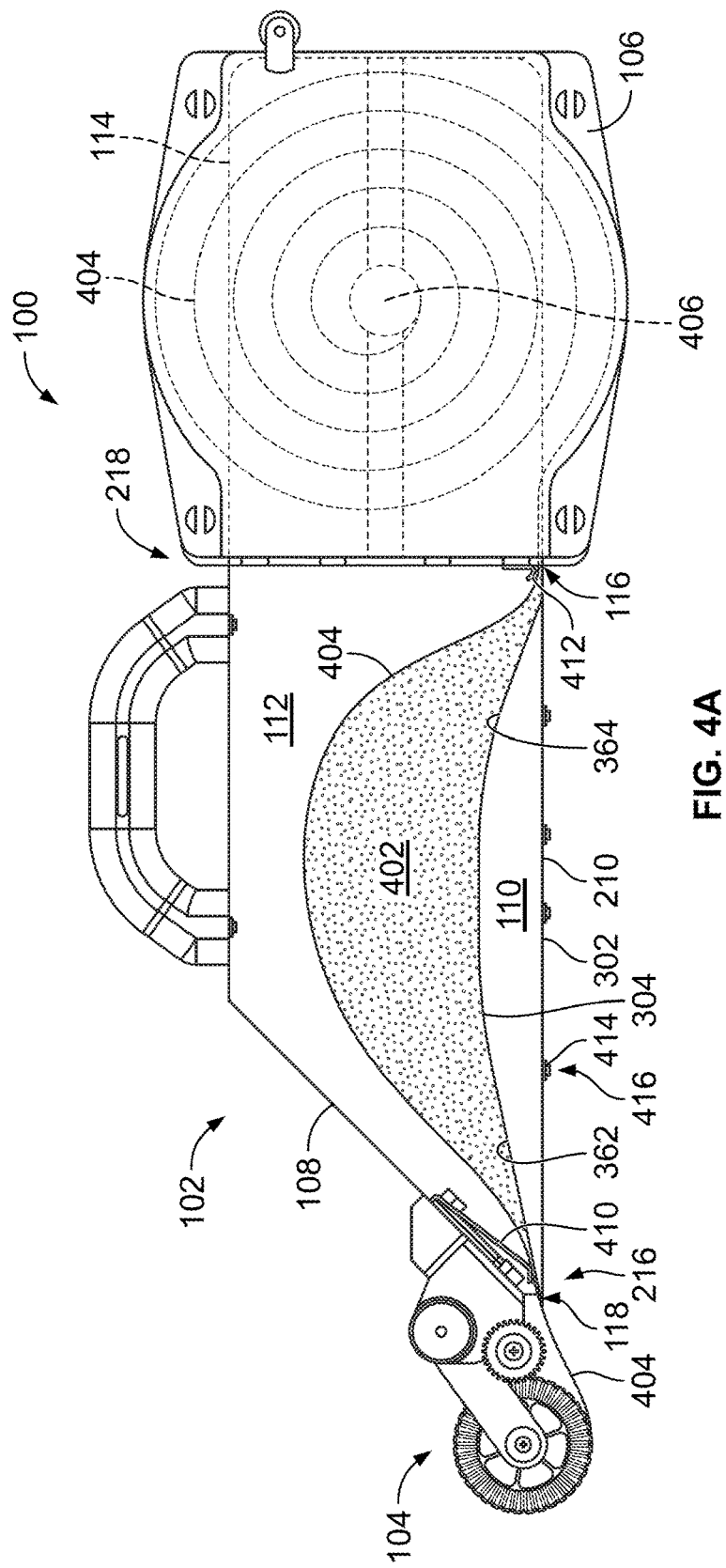
FIG. 4A illustrates the banjo assembly FIG. 1 with joint compound.

FIG. 4A illustrates the banjo assembly 100 (without the door 202) when joint compound mud 402 is contained within the cavity 112 of the banjo body 108. For example, the joint compound mud 402 is a mixture of gypsum dust and/or other material(s) mixed with water. The joint compound mud 402 is applied to joints of drywall edges to form a smooth surface for primer and/or paint for an interior wall. For example, the joint compound mud 402 is applied to drywall joints via the banjo assembly 100.

As illustrated in FIG. 4A, the tape holder 114 of the drywall banjo 102 is coupled to the second end of the banjo body 108. The tape holder 114 is configured to store joint tape 404 that is to be applied to a drywall joint via the banjo assembly 100. For example, the joint tape 404 includes a paper-based tape, a fiberglass-based tape (e.g., FibaFuse® tape), and/or any other type of tape that facilitates the joint compound mud 402 in being applied to a drywall joint. In the illustrated example, the joint tape 404 is stored in the tape holder 114 as a roll of tape. For example, the tape holder 114 includes a shaft 406 around which the roll of the joint tape 404 is wound.

Further, in the illustrated example, the banjo assembly 100 includes the cover 106 that is configured to couple to the tape holder 114 and/or the banjo body 108 to enclose the joint tape 404 held by the tape holder 114. For example, the cover 106 couples to the tape holder 114 and/or the banjo body 108 via one or more latches. In some examples, the drywall banjo 102 is retrofitted with the cover 106. The cover 106 is configured to enclose the joint tape 404 within the tape holder 114 to deter particles and/or dust from the joint tape 404 from escaping into the ambient air. For example, when the joint tape 404 is fiberglass tape, the cover 106 deters fiber particles from escaping into the ambient air and being inhaled by a user. As illustrated in FIG. 4A, the joint tape 404 stored within the tape holder 114 is configured to be (1) fed into the cavity 112 of the banjo body 108 to collect the joint compound mud 402 contained in the cavity 112, (2) fed to the applicator tool 104 outside of the cavity 112, and (3) subsequently applied to the a drywall joint to apply the joint compound mud 402 collected on the joint tape 404 to the drywall joint.

In the illustrated example, a sealing arm 410 (also referred to as a first sealing arm) is located within the cavity 112 and coupled to the first end 216 of the banjo body 108. Further, a sealing arm 412 (also referred to as a second sealing arm) is located within the cavity 112 and coupled to the second end 218 of the banjo body 108. The sealing arm 410 and the sealing arm 412 are configured to prevent the joint compound mud 402 from flowing out of the cavity 112 of the banjo body 108 and/or to control a feed rate of the joint tape 404. For example, the sealing arm 412 partially covers the tape inlet 116 to deter the joint compound mud 402 from entering the tape holder 114 through the tape inlet 116 and/or to control a rate at which the joint tape 404 is fed into the cavity 112. In the illustrated example, the sealing arm 412 is flexible and includes a curved end that engages the joint tape 404 entering the cavity 112 through the tape inlet 116 to contain the joint compound mud 402 within the cavity 112 and/or to control the feed rate of the joint tape 404. Further, in the illustrated example, the sealing arm 410 partially covers the tape outlet 118 to deter the joint compound mud 402 from flowing out of the cavity 112 through the tape outlet 118 and/or to control a rate at which the joint tape 404 is fed to the applicator tool 104 and/or another applicator tool configured to apply the joint tape 404 to a drywall joint. For example, the sealing arm 410 is flexible and includes a curved end that engages the joint tape 404 exiting the cavity 112 through the tape outlet 118 to contain the joint compound mud 402 within the cavity 112 and/or to control the feed rate of the joint tape 404 coated with the joint compound mud 402.

As illustrated in FIG. 4A, the sloped mound 110 is coupled to the first side wall 210 of the side walls 206 within the cavity 112 of the banjo body 108 such that the sloped mound 110 is positioned between the tape inlet 116 and the tape outlet 118 that are defined by the side walls 206 of the banjo body 108. In the illustrated example, the sloped mound 110 is coupled to the first side wall 210 via one or more fasteners 414. For example, the drywall banjo 102 is retrofitted with the sloped mound 110. The first side wall 210 define one or more apertures 416. The fasteners 414 are configured to extend into the cavity 112 through the apertures 416 and engage sloped mound 110 to couple the sloped mound 110 to the first side wall 210 of the banjo body 108. Further, the sloped surface 304 of the sloped mound 110 projects away from the first side wall 210 within the cavity 112 when the sloped mound 110 is coupled to the first side wall 210.

In the illustrated example, the first end surface 362 of the sloped mound 110 extends beyond the sealing arm 410 and the second end surface 364 of the sloped mound 110 is spaced apart from the sealing arm 412 when the sloped mound 110 is coupled to the banjo body 108. That is, the first end surface 362 is positioned toward the tape outlet 118 and the second end surface 364 is positioned toward the tape inlet 116. Further, as illustrated in FIG. 4A, the first end surface 362 has a steepness (e.g., a slope of about 12 degrees) is less than a steepness of the second end surface 364 (e.g., a slope of about 12 degrees).

The sloped mound 110 of the illustrated example is configured to guide the joint compound mud 402 within the cavity 112 toward the joint tape 404 travelling between the tape inlet 116 and the tape outlet 118 to enable the joint compound mud to uniformly collect on a side of the joint tape 404. That is, the sloped surface 304 of the sloped mound 110 is configured to cause the joint compound mud 402 to flow toward the joint tape 404 to facilitate the joint tape 404 in uniformly collecting the joint compound mud 402 before exiting the cavity 112 through the tape outlet 118. Additionally or alternatively, the first end surface 362 of the sloped mound 110 extends beyond the sealing arm 410 in front of the tape outlet 118 to facilitate the joint compound mud 402 in being uniformly applied to the joint tape 404 as the joint tape 404 travels through the tape outlet 118.

To assemble the banjo assembly 100 for use, the cover 106 is removed from the tape holder 114 to provide access to the tape holder 114, and the door 202 of the banjo body 108 is opened to provide access to the cavity 112 of the banjo body 108. Further, the joint tape 404 is inserted into the tape holder 114. An end of the joint tape 404 is fed into the cavity 112 through the tape inlet 116, fed out of the cavity 112 through the tape outlet 118, and applied to the applicator tool 104 and/or another applicator tool coupled to the banjo body 108. The cover 106 is recoupled to enclose the joint tape 404 within the tape holder 114. Additionally, the joint tape 404 located within the cavity 112 is positioned to create a gap between the joint tape 404 and the sloped mound 110. The joint compound mud 402 is inserted into the cavity 112 within the gap between the joint tape 404 and the sloped mound 110. Subsequently, the door 202 of the banjo body 108 is closed. After the banjo assembly 100 is assembled, the banjo assembly 100 is configured to apply the joint compound mud 402 to a drywall joint via the joint tape 404. The sloped mound 110 is shaped and positioned within the cavity 112 to facilitate the joint compound mud 402 in being applied to the joint tape 404 with a substantially uniform thickness and/or without gaps along the joint tape 404 as the amount of the joint compound mud 402 within the cavity 112 is reduced through use of the banjo assembly 100.

Figure 4B:
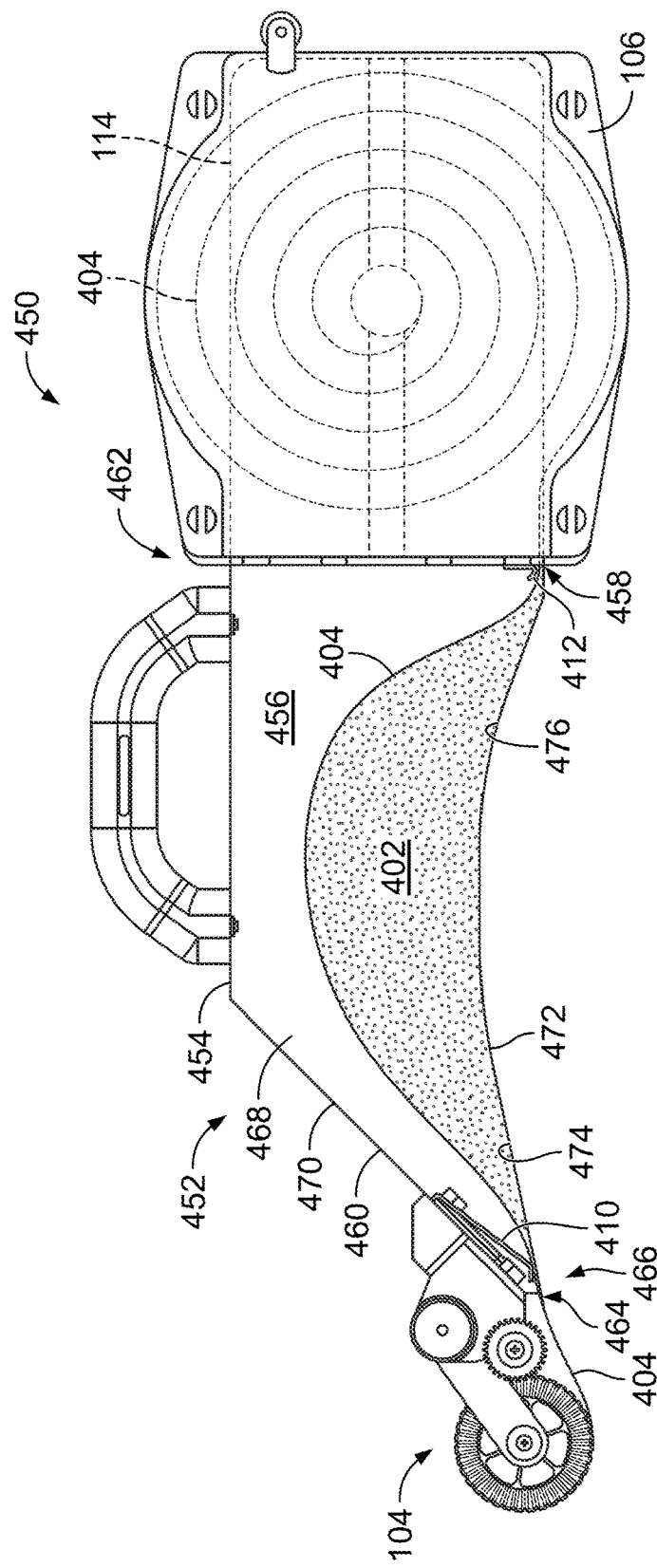
FIG. 4B illustrates another example banjo assembly in accordance with the teachings herein.

FIG. 4B illustrates another example banjo assembly 450 in accordance with the teachings herein. As illustrated in FIG. 4B, the banjo assembly 450 includes a drywall banjo 452, the applicator tool 104, and the cover 106. Further, the drywall banjo 452 includes a banjo body 454, the tape holder 114, and the door 202. In operation, the joint tape 404 housed by the tape holder 114 is fed into a cavity 456 of the banjo body 454 via a tape inlet 458 defined by side walls 460 at a second end 462 of the banjo body 454. While within the cavity 456, the joint tape 404 collects the joint compound mud 402 on one of its sides. Subsequently, the joint tape 404 is fed out of the cavity 456 of the banjo body 454 to the applicator tool 104 via a tape outlet 464 defined by the side walls 460 at a first end 466 of the banjo body 454. The applicator tool 104 applies the joint tape 404 to a drywall joint to apply the joint compound mud 402 to the drywall joint. Further, the joint tape 404 is cut from the banjo assembly 450 (e.g., via a knife) to enable the joint tape 404 to rest on the drywall joint.

The applicator tool 104, the cover 106, and the tape holder 114 of the banjo assembly 450 of FIG. 4B are identical and/or substantially similar to the applicator tool 104, the cover 106, and the tape holder 114 of the banjo assembly 100 of FIG. 4A. Because those components of the banjo assembly 450 are described in detail in connection with FIG. 4A, those components are not described in further detail below with respect to FIG. 4B. Moreover, the joint compound mud 402 and the joint tape 404 of FIG. 4B are identical and/or substantially similar to the joint compound mud 402 and the joint tape 404 of FIG. 4A. Because those components are described in detail in connection with FIG. 4A, those components also are not described in further detail below.

As illustrated in FIG. 4B, the banjo body 454 includes a panel 468 and the side walls 460 that protrude from outer edges 470 of the panel 468 to define the cavity 456. In the illustrated example, the side walls 460 extend from the outer edges 470 in a direction perpendicular to the panel 468 and have a uniform width such that the cavity 456 has a uniform thickness. That is, the banjo body 454 and the cavity 456 of the illustrated example are substantially right-prism shaped. Further, in the illustrated example, the sealing arm 410 is located within the cavity 456 and coupled to the first end 466 of the banjo body 454. Further, the sealing arm 412 is located within the cavity 456 and coupled to the second end 462 of the banjo body 454.

The sealing arm 410 and the sealing arm 412 of the banjo assembly 450 of FIG. 4B are identical and/or substantially similar to the sealing arm 410 and the sealing arm 412 of the banjo assembly 100 of FIG. 4A. Because those components of the banjo assembly 450 are described in detail in connection with FIG. 4A, those components are not described in further detail below. Moreover, the tape inlet 458 and the tape outlet 464 of the banjo assembly 450 of FIG. 4B are identical and/or substantially similar to tape inlet 116 and the tape outlet 118 of the banjo assembly 100 of FIG. 4A. Because the tape outlet 118 of the banjo assembly 100 are described in detail in connection with FIG. 4A, features of the tape inlet 458 and the tape outlet 464 are not described in further detail below.

In the illustrated example, the side walls 460 include a sloped wall 472 that extends into the cavity 456 between the tape inlet 458 and the tape outlet 464. For example, the sloped wall 472 is a concave wall. The sloped wall 472 (also referred to as a "banjo belly" and a "belly") is configured to guide the joint compound mud 402 within the cavity 456 toward the joint tape 404 travelling between the tape inlet 458 and the tape outlet 464 to enable the joint compound mud 402 in being uniformly applied on a side of the joint tape 404. That is, the sloped wall 472 is configured to cause the joint compound mud 402 to flow toward the joint tape 404 to facilitate the joint tape 404 in uniformly collecting the joint compound mud 402 before exiting the cavity 456 through the tape outlet 464.

In the illustrated example, the sloped wall 472 includes a first end surface 474 that extends beyond the sealing arm 410 and a second end surface 476 that is spaced apart from the sealing arm 412. That is, the first end surface 474 is positioned near the tape outlet 464 and the second end surface 476 is positioned near the tape inlet 458. For example, the first end surface 474 of the sloped wall 472 extends beyond the sealing arm 410 in front of the tape outlet 464 to facilitate the joint compound mud 402 in being uniformly applied to the joint tape 404 as the joint tape 404 travels through the tape outlet 464. Further, in the illustrated example, a steepness (i.e., a magnitude of slope) of the first end surface 474 is less than a steepness of the second end surface 476 to further facilitate the joint compound mud 402 in being uniformly applied to the joint tape 404.

In the illustrated example, the sloped wall 472 defines the first end surface 474, a second end surface 476, and an intermediate surface. The intermediate surface is located between the first end surface 474 and the second end surface 476. Further, the sloped wall 472 of the sloped wall 472 defines a first transition surface and a second transition surface. The first transition surface extends between the first end surface 474 and the intermediate surface, and the second transition surface extends between the second end surface 476 and the intermediate surface. In the illustrated example, the intermediate surface is flat, the first end surface 474 is flat and has a slope of about 12 degrees, and the second end surface 476 is flat and has a slope of about 20 degrees. Further, each of the first transition surface and the second transition surface of the illustrated example is rounded and has a radius of about 3 inches.

Figure 5A:
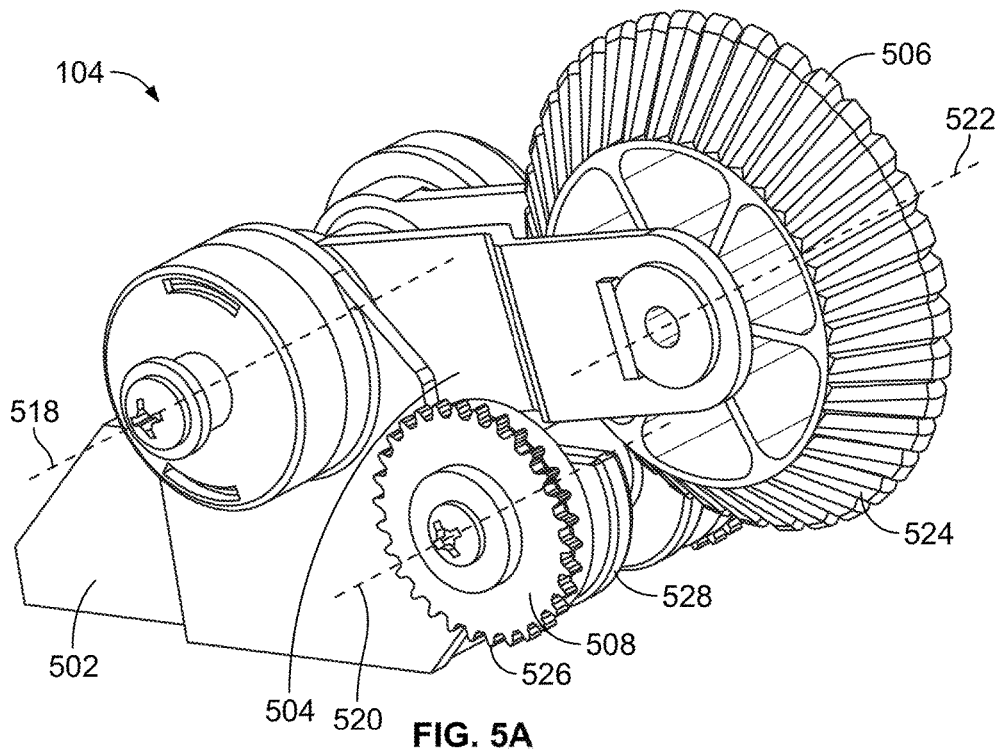
FIGS. 5A and 5B illustrate an example applicator tool of the banjo assembly of FIG. 1 in an extended position in accordance with the teachings herein.
Figure 5B:
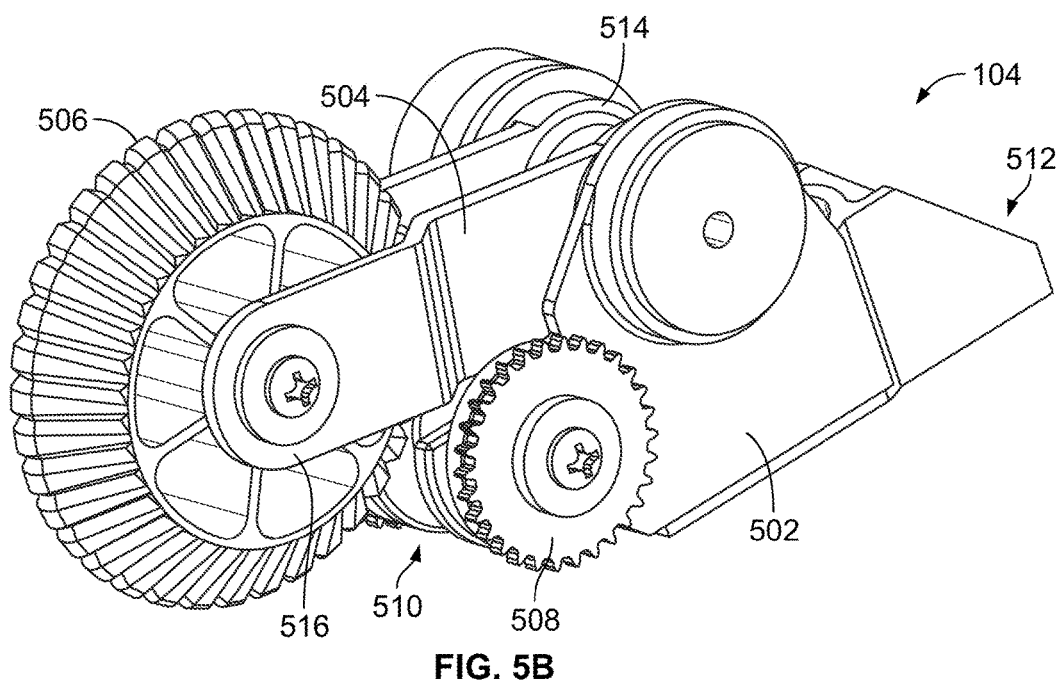

FIGS. 5A and 5B illustrate the example applicator tool 104 accordance with the teachings herein. More specifically, FIG. 5A depicts a first perspective view and FIG. 5B depicts a second perspective view of the applicator tool 104 in an extended position.

As illustrated in FIGS. 5A and 5B, the applicator tool 104 includes a base 502 that is configured to couple to a banjo body (e.g., the banjo body 108 of the drywall banjo 102, the banjo body 454 of the drywall banjo 452) that dispenses joint tape (e.g., the joint tape 404). For example, the drywall banjo 102 and/or the drywall banjo 452 is retrofitted with the applicator tool 104. In other examples, the base 502 of the applicator tool 104 is integrally formed with a banjo body (e.g., the banjo body 108, the banjo body 454). Further, the applicator tool 104 includes an arm 504, a corner wheel 506, and side wheels 508. For example, the arm 504 is rotatably coupled to the base 502, the corner wheel 506 is rotatably coupled to the arm 504, and the side wheels 508 are rotatably coupled to the base 502.

The base 502 of the illustrated example includes a first end 510 and a second end 512 opposite the first end 510. The second end 512 is configured to couple to a banjo body of a drywall banjo (e.g., the banjo body 108 of the drywall banjo 102, the banjo body 454 of the drywall banjo 452), and the side wheels 508 are rotatably coupled to the first end 510 of the base 502 (e.g., via respective axle assemblies 706 of FIGS. 7A and 7B). Further, the arm 504 includes a proximal end 514 that is rotatably coupled to the base 502 (e.g., via an axle assembly 708 of FIGS. 7A and 7B) and a distal end 516 opposite the proximal end 514 to which the corner wheel 506 is coupled (e.g., via an axle assembly 704 of FIGS. 7A and 7B). For example, the proximal end 514 of the arm 504 is rotatably coupled to the base 502 about an axis 518 (e.g., a first axis), the side wheels 508 are rotatably coupled to the base 502 about an axis 520 (e.g., a second axis), and the corner wheel 506 is rotatably coupled to the distal end 516 of the arm 504 about an axis 522 (e.g., a third axis). In the illustrated example, each of the axis 518, the axis 520, and the axis 522 are parallel and offset relative to each other. Further, the proximal end 514 of the arm 504 is rotatably coupled to the base 502 to enable the arm 504 to rotate between an extended position (as shown in FIGS. 5A and 5B) and a retract position (as shown in FIG. 6).

In the extended position, the arm 504 is rotated such that the corner wheel 506 extends beyond the side wheels 508 at the first end 510 of the base 502 to enable the corner wheel 506 to apply the joint tape 404 dispensed from the drywall banjo 102 and/or the drywall banjo 452. For example, the corner wheel 506 is configured to apply the joint tape 404 along an internal corner joint of drywall when the arm 504 is in the extended position. As illustrated in FIGS. 4A and 4B, the corner wheel 506 is positioned relative to the side wheels 508 and the tape outlet 118 in the extended position such that the joint tape 404 extends from the tape outlet 118 to the corner wheel 506 without contacting the side wheels 508. For example, the position of the base 502 relative to the tape outlet 118, a length of the arm 504, a direction of the arm 504 in the extended position, a large radius of the corner wheel 506 wheel relative to that of the side wheels 508, and/or relative positions of the axes, 518, 520, 522 enable the corner wheel 506 to extend beyond the side wheels 508 in such a manner in the extended position. Returning to FIGS. 5A and 5B, the corner wheel 506 of the illustrated example includes an outer surface 524 that is configured to engage the joint tape 404. In the illustrated example, the outer surface 524 includes ribs (e.g., lateral ribs 828 of FIGS. 8A-8F) that are configured to facilitate the corner wheel 506 in gripping the joint tape 404. The outer surface 524 of the illustrated example also includes a vertex (e.g., a vertex of FIGS. 8A-8F) that is rounded to deter the outer surface 524 of the corner wheel 506 from puncturing the joint tape 404 (e.g., a fiberglass-based tape such as Fiba-Fuse®, a paper-based tape, etc.) as the corner wheel 506 applies the joint tape 404 to a corner drywall joint.

In the retracted position, the arm 504 is rotated such that the corner wheel 506 extends in a direction away from the side wheels 508 to enable the side wheels 508 to apply the joint tape 404 dispensed from the drywall banjo 102 and/or the drywall banjo 452. For example, the side wheels 508 are configured to apply the joint tape 404 along a flat drywall joint when the arm 504 is in the retracted position. In the illustrated example, the side wheels 508 are discs (also referred to as side discs) that include teeth 526 to facilitate gripping of the joint tape 404. Further, as illustrated in FIGS. 5A and 5B, a portion of the first end 510 is rounded to facilitate the joint tape 404 in being fed to the side wheels 508 from a tape outlet (e.g., the tape outlet 118 of the drywall banjo 102, the tape outlet 464 of the drywall banjo 452) without tearing. For example, the first end 510 includes a rounded surface 528 along which the joint tape 404 travels from the drywall banjo 102 and/or the drywall banjo 452 to the side wheels 508 to deter the joint tape 404 from tearing before reaching the side wheels 508.

FIG. 6 illustrates the applicator tool 104 when the arm 504 is in the retracted position. As illustrated in FIG. 6, the arm 504 is rotated in the retracted position such that the corner wheel 506 extends in a direction away from the side wheels 508. In the illustrated example, the corner wheel 506 extends to and/or beyond the second end 512 of the base 502 away from the side wheels 508 when the arm 504 is in the retracted position.

Figure 7B:
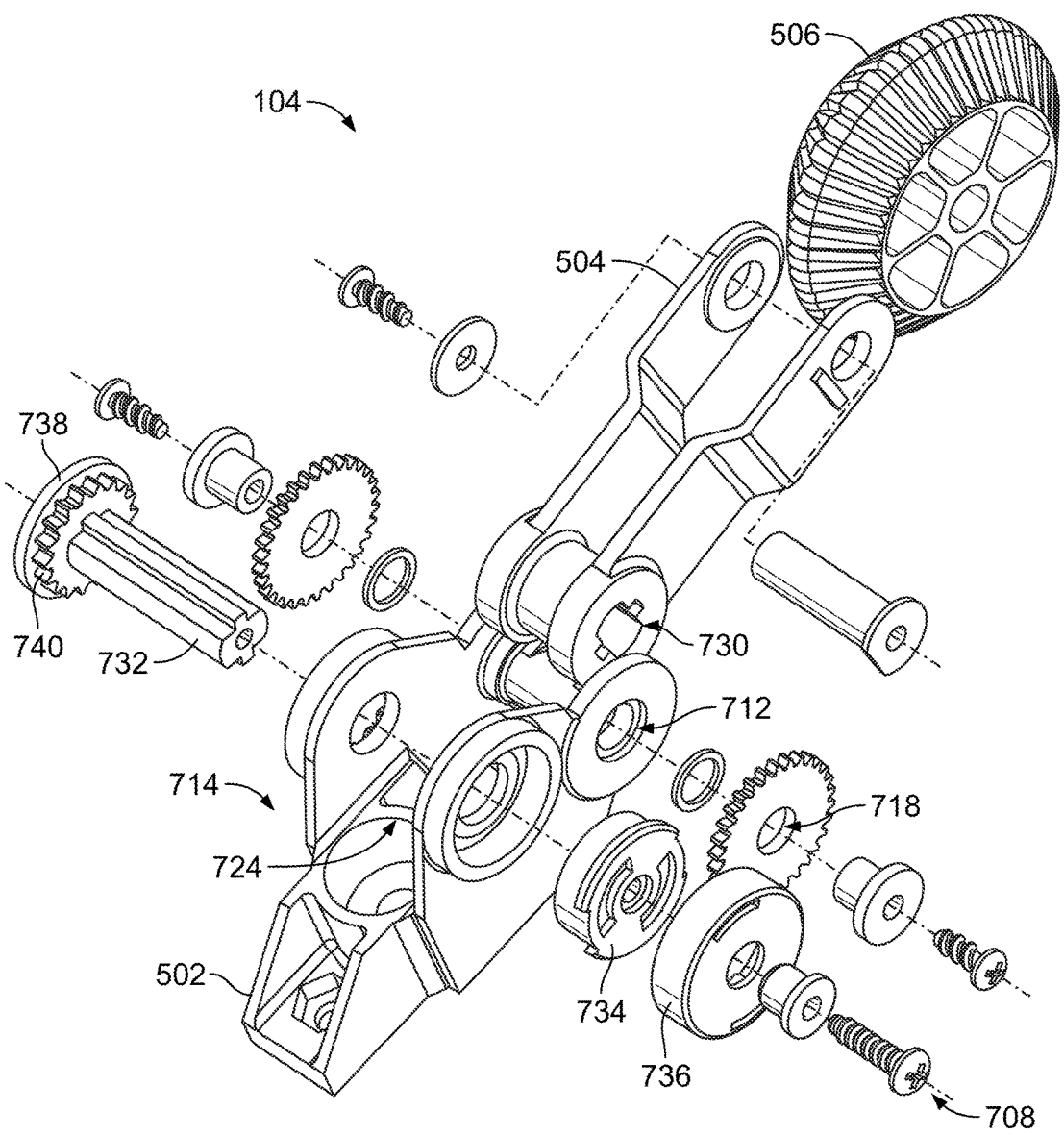

FIGS. 7A and 7B depict exploded views of the applicator tool 104. More specifically, FIG. 7A is a first exploded view and FIG. 7B is a second exploded view of the applicator tool 104.

As illustrated in FIGS. 7A and 7B, the base 502 defines one or more apertures 702 through which fasteners are to extend to couple the base 502 of the applicator tool 104 to a banjo body of a drywall banjo (e.g., the banjo body 108 of the drywall banjo 102, the banjo body 454 of the drywall banjo 452). Further, the applicator tool 104 includes an axle assembly 704 that is configured to rotatably couple the corner wheel 506 to the distal end 516 of the arm 504, axle assemblies 706 that are configured to couple the side wheels 508 to the base 502, and an axle assembly 708 that is configured to couple the proximal end 514 of the arm 504 to the base 502.

In the illustrated example, the arm 504 of the applicator tool 104 is two-pronged. For example, the proximal end 514 of the arm 504 forms the base of the prongs, and the distal end 516 of the arm 504 forms the ends of the prongs. The corner wheel 506 is configured to be positioned between the two prongs when rotatably coupled to the distal end 516 of the arm 504. Each of the prongs defines an aperture 710 at the distal end 516 through which the axle assembly 704 extends to couple the corner wheel 506 to the distal end 516 of the arm 504. For example, the axle assembly 704 includes a flanged pin that extends along the axis 522 through each of the apertures 710 and an aperture (e.g., an aperture 810 of FIGS. 8A-8E) through a center of the corner wheel 506. The axle assembly 704 also includes a washer and a screw that extends through the washer and fastens to an end of the flanged pin to rotatably couple the corner wheel 506 to the distal end 516 of the arm 504.

As illustrated in FIGS. 7A and 7B, the base 502 defines holes 712 near the first end 510 of the base 502. For example, one of the holes 712 is defined along a first side 714 of the base 502, and another of the holes 712 is defined along an opposing second side 716 of the base 502. The axle assemblies 706 extend into the holes 712 to couple the side wheels 508 to the base 502. For example, one of the axle assemblies 706 extends into one of the holes 712 to couple one of the side wheels 508 to the first side 714 of the base 502, and another of the axle assemblies 706 extends into another one of the holes 712 to couple another one of the side wheels 508 to the second side 716 of the base 502. In the illustrated example, each of the axle assemblies 706 includes (i) a ring that is inserted into the corresponding one of the holes 712; (ii) a flanged pin that extends along the axis 520, through an aperture 718 defined by the corresponding one of the side wheels 508, and into the corresponding one of the holes 712; and (iii) a screw that is inserted into the flanged pin to couple the flanged pin to the base 502 within the corresponding one of the holes 712.

The base 502 of the illustrated example also includes a side wall 720 (also referred to as a first side wall) that extends along the first side 714 of the base 502 between the first end 510 and the second end 512 and a side wall 722 (also referred to as a second side wall) that extends along the second side 716 of the base 502 between the first end 510 and the second end 512. The base 502 defines a channel 724 between the side wall 720 and the side wall 722 into which the proximal end 514 of the arm 504 extends to couple to the base 502. Further, the channel 724 is shaped to enable the arm 504 to rotate (e.g., approximately 180 degrees) about the axis 518 when the proximal end 514 of the arm 504 is coupled to the base 502. Further, the side wall 720 defines an aperture 726 and the side wall 722 defines an aperture 728 that is aligned with aperture 726 along the axis 518. The axle assembly 708 is configured through the apertures 726, 728 defined by the base 502 and a keyed aperture 730 defined by the proximal end 514 of the arm 504 to rotatably couple the arm 504 to the base 502.

In the illustrated example, the axle assembly 708 includes keyed shaft 732, an end cap 734, an end cap cover 736, a flanged pin, and a screw. The keyed shaft 732 matches the keyed aperture 730 of the arm 504. That is, the keyed shaft 732 is configured to extend through the keyed aperture 730 to fixedly couple to the arm 504 to the keyed shaft 732 such that keyed shaft 732 and the arm 504 rotate together. The keyed shaft 732 also is configured to extend through the apertures 726, 728 of the base 502 and be received by the end cap 734. That is, to rotatably couple the arm 504 to the base 502, the keyed shaft 732 (i) extends through the aperture 726 defined by the side wall 720 of the base 502, (ii) extends through the keyed aperture 730 defined by the arm 504, (iii) extends through the aperture 728 defined by the side wall 722 of the base 502, and (iv) is received by the end cap 734. Further, the screw of the axle assembly 708 extends through the flanged pin, the end cap cover 736, and the end cap 734 and is received by the keyed shaft 732 to assemble the axle assembly 708 together.

As illustrated in FIGS. 7A and 7B, the keyed shaft 732 of the axle assembly 708 includes a flange 738 that includes external teeth 740. Further, the aperture 726 defined by the side wall 720 of the base 502 includes internal teeth 742 that are configured to receive the external teeth 740 of the flange 738 of the keyed shaft 732. The teeth 740, 742 enable the orientation of the arm 504 to be adjusted and set relative to the base 502. For example, to rotate the arm 504 between the extended position and the retracted position, the keyed shaft 732 is (i) slid along the axis 518 away from the side wall 720 to disengage the teeth 740, 742, (ii) rotated about the axis 518 to the desired orientation, and (iii) slid along the axis 518 toward the side wall 720 to reengage the teeth 740, 742. Further, the end cap cover 736 of the illustrated example is configured to enable and/or prevent movement of the keyed shaft 732. For example, when the end cap cover 736 is coupled to the end cap 734, the end cap cover 736 prevents the end cap 734 and, thus, the keyed shaft 732 and the arm 504 from rotating relative to the base 502. In contrast, when the end cap cover 736 is decoupled to the end cap 734, the end cap 734 and, thus, the keyed shaft 732 and the arm 504 are enabled to rotate relative to the base 502.

Figure 8A:
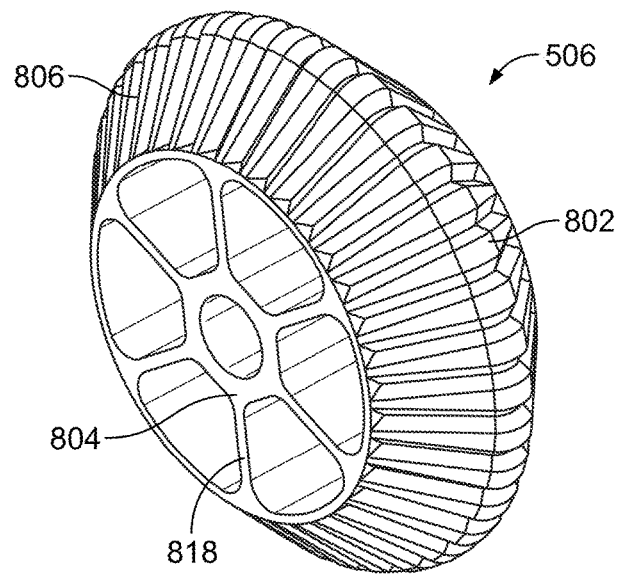
FIG. 8A is a perspective view of an example corner wheel of the applicator tool of FIGS. 5A-7B in accordance with the teachings herein.
Figures 8B, 8C:
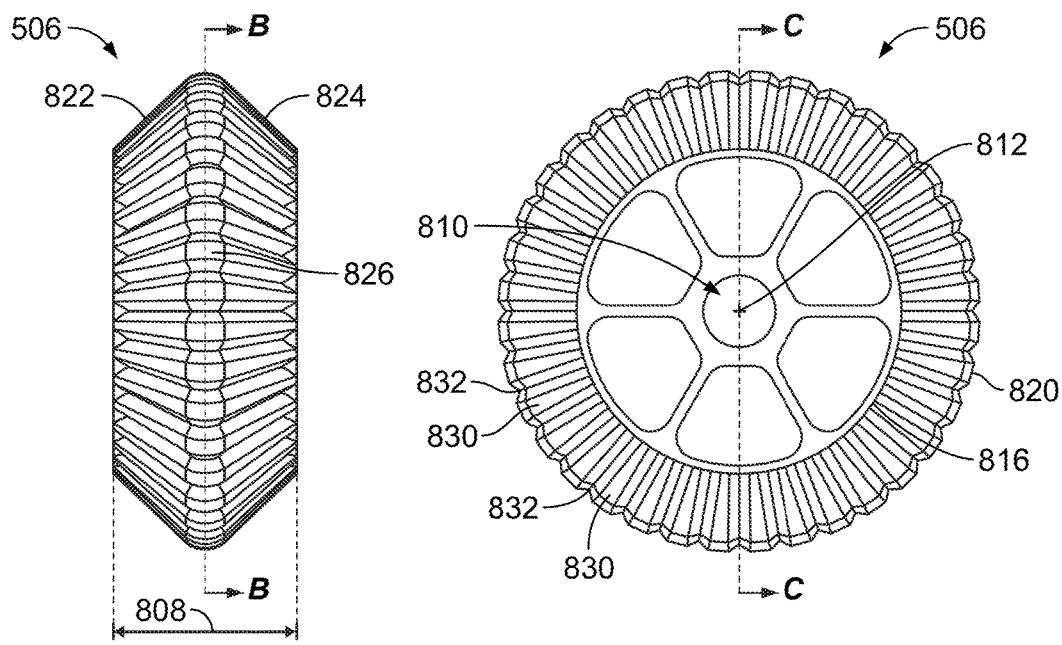
FIG. 8B is a front view of the corner wheel of FIG. 8A.
FIG. 8C is a side view of the corner wheel of FIG. 8A.
Figure 8D:
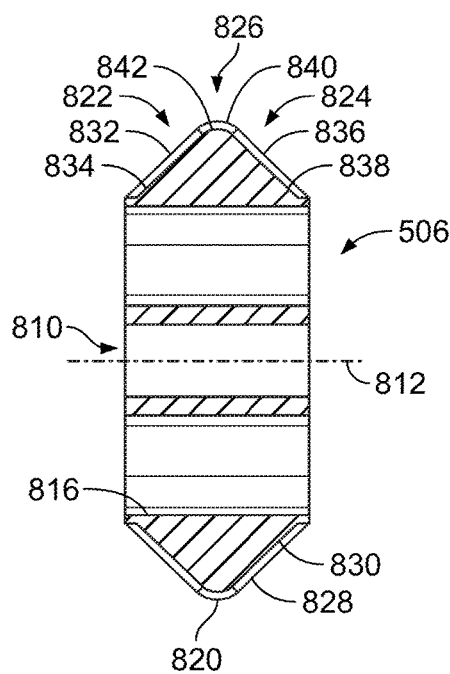
FIG. 8D is a cross-section of the corner wheel taken along line C-C in FIG. 8C.
Figure 8E:
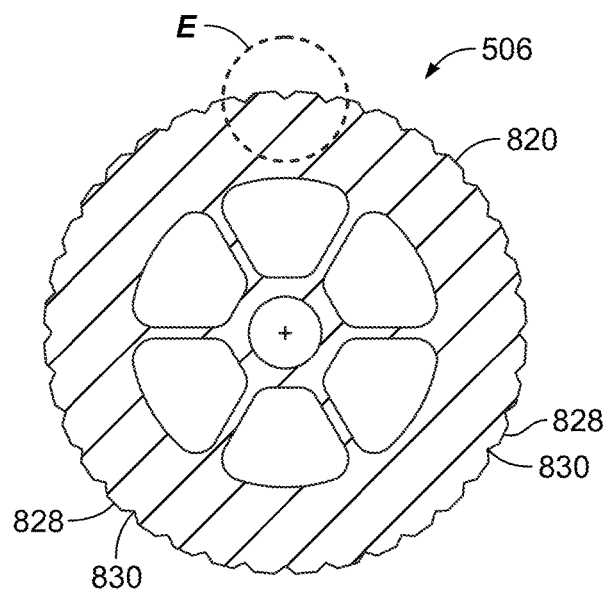
FIG. 8E is a cross-section of the corner wheel taken along line B-B in FIG. 8B.
Figure 8F:
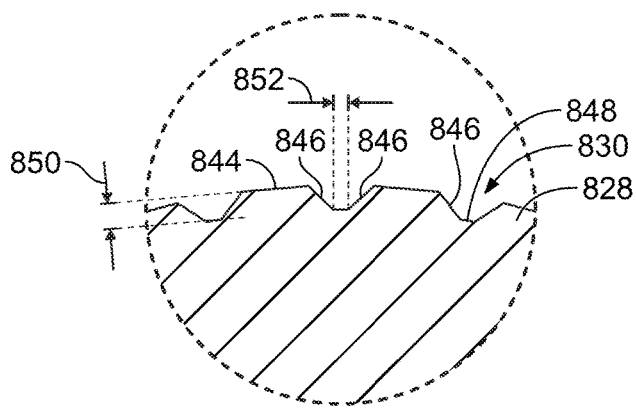
FIG. 8F is a magnified view of section E of FIG. 8E.

FIGS. 8A-8F illustrate the example corner wheel 506 in accordance with the teachings herein. More specifically, FIG. 8A is a perspective view of the corner wheel 506, FIG. 8B is a front view of the corner wheel 506, FIG. 8C is a side view of the corner wheel 506, FIG. 8D is a cross-section of the corner wheel 506 taken along line C-C in FIG. 8C, FIG. 8E is a cross-section of the corner wheel 506 taken along line B-B in FIG. 8B, and FIG. 8F is a magnified view of a portion of the corner wheel 506 taken from section E of FIG. 8E.

As illustrated in FIGS. 8A-8C, the corner wheel 506 includes a body 802 that includes an inner portion 804 and an outer surface 806. The body 802 has a width 808. For example, the width 808 (e.g., of about 0.98 inches) is substantially equal to a width of joint tape (e.g., the joint tape 404 of FIGS. 4A and 4B) to facilitate the corner wheel 506 in gripping the joint tape and applying the joint tape to a corner drywall joint. Further, the corner wheel 506 is formed of a rubber material and/or any other type of material that facilitates gripping of the joint tape by the corner wheel 506 and/or the removal of excess joint compound mud (e.g., the joint compound mud 402 of FIGS. 4A and 4B) from the corner wheel 506. The inner portion 804 defines an aperture 810 extending through a center axis 812 of the corner wheel 506. An axle (e.g., the axle assembly 704 of FIGS. 7A-7B, an axle 920 of FIG. 9) is configured to extend through the aperture 810 to rotatably couple the corner wheel 506 to a base (e.g., to the base 502 via the arm 504 of FIGS. 5A-7B, to a base 902 of FIG. 9). For example, the aperture 810 has a radius (e.g., of about 0.2 inches) that enables the axle to rotatably couple the corner wheel 506 to a base. When the corner wheel 506 is rotatably coupled to a base via an axle, the corner wheel 506 is configured to roll along a corner drywall joint to apply joint tape to the corner drywall joint. Further, the inner portion 804 extends between the aperture 810 and an inner circumference 816 (e.g., corresponding with a radius of about 0.89 inches) of the corner wheel 506. The inner portion 804 of the illustrated example also includes spokes 818. For example, the inner portion 804 includes the spokes 818 to reduce a weight and/or an amount of material of the corner wheel 506. In other examples, the inner portion 804 may be solid without any spokes.

In the illustrated example, the outer surface 806 extends between the inner circumference 816 and an outer circumference 820 (e.g., corresponding with a radius of about 1.315 inches) of the corner wheel 506. Further, the outer surface 806 includes a first angled surface 822, a second angled surface 824 opposite the first angled surface 822 and a rounded vertex 826 between the first angled surface 822 and the second angled surface 824. For example, the first angled surface 822 is configured to press joint tape against a first drywall that defines a corner drywall joint, and the second angled surface 824 is configured to press the joint tape against a second drywall that defines the corner drywall joint. That is, the first angled surface 822 and the second angled surface 824 are configured to simultaneously press the joint tape against both adjoining drywalls that form the corner drywall joint. Further, the rounded vertex 826 of the corner wheel 506 is rounded to deter the corner wheel 506 from perforating the joint tape (e.g., a fiberglass-based tape such as FibaFuse®, a paper-based tape, etc.) being applied to the corner drywall joint. As illustrated in FIG. 8B, the rounded vertex 826 is centrally located along the width 808 of the corner wheel 506 to facilitate the corner wheel 506 in applying the joint tape evenly to both drywalls forming the corner drywall joint.

As illustrated in FIGS. 8A-8C, the outer surface 806 of the corner wheel 506 includes alternating lateral ribs 828 and lateral grooves 830 that are configured to facilitate the corner wheel 506 in gripping the joint tape. That is, the lateral ribs 828 and the lateral grooves 830 with respect to each other along the outer circumference 820 of the corner wheel 506. Further, the lateral ribs 828 and the lateral grooves 830 extend the width 808 of the corner wheel 506 between opposing sides (e.g., a first side and a second side) of the corner wheel 506.

FIG. 8D depicts a cross-section of the corner wheel 506 taken along line C-C in FIG. 8C. For example, the cross-section illustrates the aperture 810 extending along the center axis 812, the inner circumference 816, the outer circumference 820, the lateral ribs 828, and the lateral grooves 830. As illustrated in FIG. 8D, the first angled surface 822 includes a first rib surface 832 and a first groove surface 834, the second angled surface 824 includes a second rib surface 836 and a second groove surface 838, and the rounded vertex 826 includes a rounded rib vertex 840 and a rounded groove vertex 842. The first rib surface 832, the second rib surface 836, and the rounded rib vertex 840 define the lateral ribs 828. Further, the first groove surface 834, the second groove surface 838, and the rounded groove vertex 842 define the lateral grooves 830. In the illustrated example, the rounded rib vertex 840 of the rounded vertex 826 has a radius (e.g., about 0.156 inches) and the rounded groove vertex 842 of the rounded vertex 826 has a radius (e.g., about 0.106 inches) that deter perforations of the joint tape from being formed by the corner wheel 506.

Further, in FIG. 8D, the first angled surface 822 and the second angled surface 824 are oriented with respect to each other at a right angle to facilitate the first angled surface 822 and the second angled surface 824 in simultaneously pressing joint tape against respective first drywall and second drywall that define a right-angled corner drywall joint as the corner wheel 506 rolls along the right-angled corner drywall joint. For example, the first angled surface 822 is oriented at an angle (e.g., about 45 degrees) with respect to the center axis 812 and the second angled surface 824 is oriented at an angle (e.g., about 45 degrees) with respect to the center axis 812 such that a right angle is formed between the first angled surface 822 and the second angled surface 824.

FIG. 8E depicts a cross-section of the corner wheel 506 taken along line B-B in FIG. 8B. In the illustrated example, each alternating set of one of the lateral ribs 828 and one of the lateral grooves 830 extends about 10 degrees around the outer circumference 820 of the corner wheel 506. That is, there are about thirty-six alternating sets of the lateral ribs 828 and the lateral grooves 830 extending along the corner wheel 506 to facilitate the corner wheel 506 in gripping the joint tape. In other examples, the corner wheel 506 may include more or less alternating sets of the lateral ribs 828 and the lateral grooves 830 to facilitate the corner wheel 506 in gripping the joint tape.

FIG. 8F is a magnified view of a portion of the corner wheel 506 taken from section E of FIG. 8E. More specifically, FIG. 8F depicts a cross-section of a plurality of the lateral ribs 828 and a plurality of the lateral grooves 830. As illustrated in FIG. 8F, each of the lateral ribs 828 is defined by an outer surface 844 and two side walls 846 opposing each other. Further, each of lateral grooves 830 is defined by an inner surface 848 and two of the side walls 846 opposing each other. In the illustrated example, each of the side walls 846 are inclined at a same angle (of about 46 degrees) with respect to a radial line of the corner wheel 506 such that each of the lateral ribs 828 and the lateral grooves 830 are symmetrical. For example, the side walls 846 are inclined at an angle to facilitate the corner wheel 506 in gripping joint tape. Further, in the illustrated example, each of the lateral ribs 828 has a height 850 (e.g., of about 0.49 inches) and the inner surface 848 of each of the lateral grooves 830 has a length 852 (e.g., of about 0.012 inches). The lateral ribs 828 and the lateral ribs 828 are configured (e.g., are shaped and sized) to facilitate the corner wheel 506 in gripping the joint tape.

Figure 9:
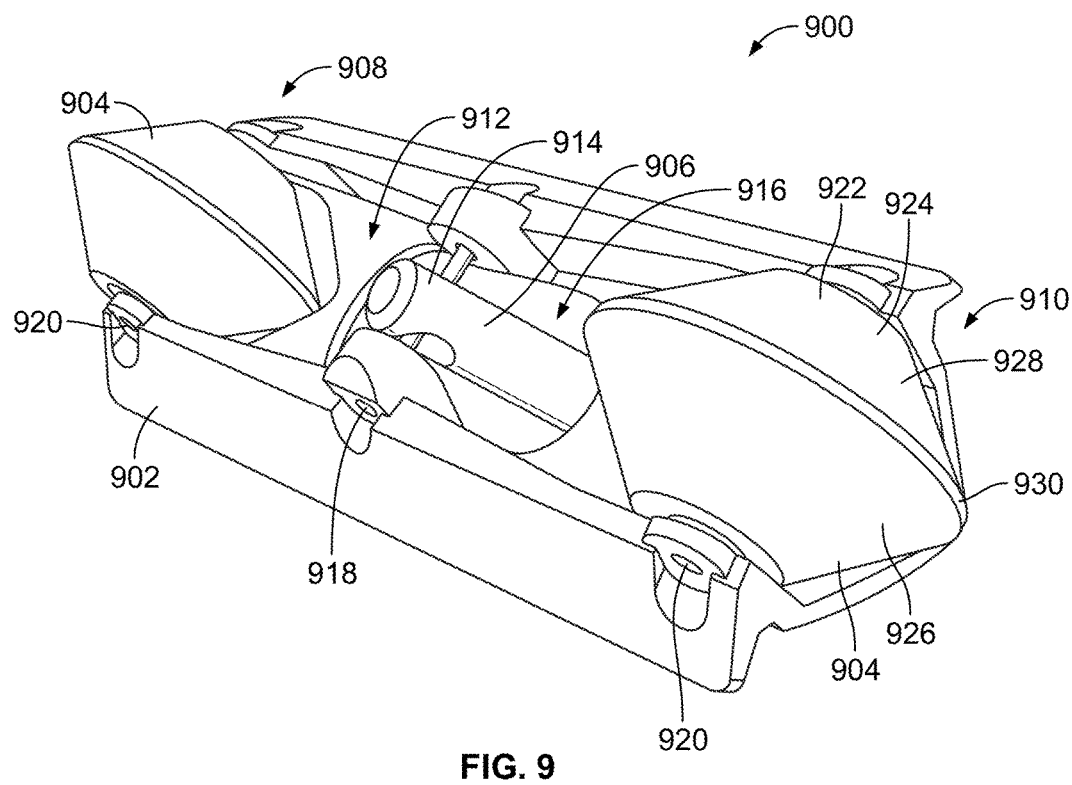
FIG. 9 illustrates an example rolling tool in accordance with the teachings herein.

FIG. 9 illustrates an example rolling tool 900 in accordance with the teachings herein. The rolling tool 900 is configured to press joint tape (e.g., the joint tape 404 of FIGS. 4A and 4B) against drywall forming a corner drywall joint after the joint tape has been applied to the corner drywall joint, for example, to ensure that joint tape has been properly applied to the corner drywall joint. As illustrated in FIG. 9, the rolling tool 900 includes a base 902, one or more corner wheels 904, and a shaft 906.

In the illustrated example, the corner wheels 904 are rotatably coupled to the base 902. Further, the corner wheels 904 are configured to roll along a corner drywall joint to press joint tape against both drywall boards (e.g., a first drywall and a second drywall) forming the corner drywall joint. For example, the corner wheels 904 are sized and positioned relative to the base 902 such that each of the corner wheels 904 are configured to simultaneously press against both of the drywall boards forming the corner drywall joint while rolling along the corner drywall joint.

As illustrated in FIG. 9, the base 902 includes a first end 908 and a second end 910 opposite the first end 908. In the illustrated example, one (e.g., a first) of the corner wheels 904 is rotatably coupled to the base 902 at the first end 908, and another (e.g., a second) of the corner wheels 904 is rotatably coupled to the base 902 at the second end 910. In other examples, one or more of the corner wheels 904 may be located at any other position with respect to the base 902 that enables it to roll along a corner drywall joint with the other of the corner wheels 904. Additionally or alternatively, other examples of the rolling tool 900 include less (e.g., 1) or more (e.g., 3, 4, 5, etc.) of the corner wheels 904.

In the illustrated example, the base 902 defines a channel 912 in which the corner wheels 904 are partially positioned. For example, the channel 912 extends between the first end 908 and the second end 910 along a length of the base 902. The corner wheels 904 protrude from the channel 912 to enable the corner wheels 904 to roll along a corner drywall joint. For example, about half of the corner wheels 904 are positioned within the channel 912, and about half of the corner wheels 904 protrude from the channel 912 to enable the corner wheels 904 to press against the drywall forming the corner drywall joint. In other examples, the base 902 may define a plurality of channels or cavities in which corner wheels 904 are partially positioned. For example, the base 902 may define a first cavity in which a first of the corner wheels 904 is partially positioned and a second cavity in which a second of the corner wheels 904 is partially positioned.

Further, the shaft 906 of the rolling tool 900 is coupled to the base 902 and configured to enable a user to position the corner wheels 904 along a corner drywall joint. For example, the base 902 and the corner wheels 904 are coupled to an end 914 of the shaft 906 and the shaft 906 is configured to be held by a user to enable the user to position and roll the corner wheels 904 along a corner drywall joint. In the illustrated example, the end 914 of the shaft 906 is coupled to the base 902 centrally along the length of the base 902. For example, the shaft 906 is centrally positioned relative to the base 902 to enable to stabilize the base 902. Further, the shaft 906 of the illustrated example is rotatably coupled to the base 902 (e.g., via an axle, a ball joint, etc.) to enable the orientation of the shaft 906 with respect to the base 902 to change during use. For example, the shaft 906 is rotatably coupled to the base 902 to facilitate a user in rolling the corner wheels 904 along a corner drywall joint. In the illustrated example, the base 902 defines an aperture 916 into which the end 914 of the shaft 906 extends to rotatably couple to the base 902 via an axle 918. In FIG. 9, the aperture 916 extends in a direction that is perpendicular to the axes of the corner wheels 904. The aperture 916 of the illustrated example also is perpendicular to the channel 912 and intersects a center point of the channel 912. Further, the aperture 916 has a significantly larger diameter than the shaft 906 extending through the aperture 916 to enable the shaft 906 to rotate relative to the base 902.

As illustrated in FIG. 9, each of the corner wheels 904 are coupled to the base 902 via a respective axle 920. The corner wheels 904 are arranged in a line to enable each of the corner wheels 904 to simultaneously roll along a corner drywall joint. In the illustrated example, each of the corner wheels 904 has a body 922 that defines an outer surface 924. The outer surface 924 includes a first angled surface 926, a second angled surface 928 opposite the first angled surface 926 and a rounded vertex 930 between the first angled surface 926 and the second angled surface 928. For example, the first angled surface 926 and the second angled surface 928 are oriented with respect to each other at a right angle to facilitate the first angled surface 926 and the second angled surface 928 in simultaneously pressing joint tape against respective first drywall and second drywall that define a right-angled corner drywall joint. The rounded vertex 930 of the outer surface 924 is rounded (e.g., having a radius of between about 0.106 and 0.156 inches) to deter the corresponding one of the corner wheels 904 from perforating joint tape while rolling over the joint tape along a corner drywall joint. For example, the rounded vertex 930 of each of the corner wheels 904 is centrally located with respect to a corresponding wheel width.

In one example, the outer surface 924 of each of the corner wheels 904 is smooth. For example, each of the first angled surface 926 and the second angled surface 928 has a flat cross-section. In another example, each of the corner wheels 904 is the corner wheel 506. For example, the outer surface 924 of each of the corner wheels 904 is the outer surface 806 that includes the lateral ribs 828 and the lateral grooves 830 to facilitate the corner wheels 904 in gripping the joint tape along the corner drywall joint. Because components of the corner wheel 506 are described in detail in connection with FIGS. 8A-8F, those components are not described in further detail below with respect to the corner wheels 904 of FIG. 9. In yet another example, one or more of the corner wheels 904 has a flat outer surface and one or more of the corner wheels 904 is the corner wheel 506 with the lateral ribs 828 and the lateral grooves 830.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A tool for applying joint tape to drywall, the tool comprising:
    a base configured to couple to a drywall banjo that dispenses the joint tape;
    an arm including a proximal end and a distal end opposite the proximal end, the proximal end rotatably coupled to the base to enable the arm to rotate between an extended position and a retracted position, the arm rotatably coupled to the base about a first axis;
    a corner wheel rotatably coupled to the distal end of the arm to enable the corner wheel to apply the joint tape along a corner drywall joint when the arm is in the extended position; and
    side wheels rotatably coupled to the base to enable the side wheels to apply the joint tape along a flat drywall joint when the arm is in the retracted position, the side wheels rotatably coupled to the base about a second axis that is parallel to and offset from the first axis.

2. The tool of claim 1, wherein the corner wheel is rotatably coupled to the arm about a third axis that is parallel to and offset from the first axis.

3. The tool of claim 1, wherein an outer surface of the corner wheel includes ribs to facilitate the corner wheel in gripping the joint tape.

4. The tool of claim 3, wherein a vertex of the outer surface is rounded to deter the corner wheel from puncturing the joint tape.

5. The tool of claim 1, wherein the side wheels include teeth to facilitate the side wheels in gripping the joint tape.

6. The tool of claim 1, wherein each of the side wheels are coupled to the base via a respective axle assembly.

7. The tool of claim 1, wherein the base includes a first end to which the side wheels are coupled and a second end that is configured to couple to the drywall banjo.

8. The tool of claim 7, wherein a portion of the first end is rounded to facilitate the joint tape in being fed to the side wheels from the drywall banjo without tearing.

9. The tool of claim 7, wherein the corner wheel is to extend beyond the side wheels at the first end when the arm is in the extended position.

10. The tool of claim 9, wherein the corner wheel is to extend beyond the second end away from the side wheels when the arm is in the retracted position.

11. The tool of claim 1, wherein the arm is coupled to the body via an axle assembly.

12. A tool for applying joint tape to drywall, the tool comprising:
    a base configured to couple to a drywall banjo that dispenses the joint tape;
    an arm including a proximal end and a distal end opposite the proximal end, the proximal end rotatably coupled to the base to enable the arm to rotate between an extended position and a retracted position, the arm coupled to the body via an axle assembly, wherein the axle assembly includes a keyed shaft and an end cap, wherein the keyed shaft extends through a keyed aperture of the arm to fixedly couple the arm to the keyed shaft, wherein the keyed shaft extends through apertures defined by the base, extends through the keyed aperture defined by the arm, and is received by the end cap to rotatably couple the arm to the base;
    a corner wheel rotatably coupled to the distal end of the arm to enable the corner wheel to apply the joint tape along a corner drywall joint when the arm is in the extended position; and
    side wheels rotatably coupled to the base to enable the side wheels to apply the joint tape along a flat drywall joint when the arm is in the retracted position.

13. The tool of claim 12, wherein the keyed shaft includes a flange with external teeth, wherein one of the apertures defined by the base includes internal teeth that are configured to receive the external teeth of the flange to adjust and set a position of the arm relative to the base.

14. The tool of claim 13, wherein the axle assembly includes an end cap cover, wherein the end cap cover couples to the end cap to prevent the keyed shaft from rotating relative to the base, wherein the end cap cover decouples from the end cap to enable the keyed shaft to be rotated relative to the base.

15. A tool for applying joint tape to drywall, the tool comprising:
    a base configured to couple to a drywall banjo that dispenses the joint tape;
    an arm including a proximal end and a distal end opposite the proximal end, the proximal end configured to rotatably couple to the base to enable the arm to rotate between an extended position and a retracted position, the arm configured to rotatably couple to the base about a first axis;
    a corner wheel configured to rotatably couple to the distal end of the arm to enable the corner wheel to apply the joint tape along a corner drywall joint when the arm is in the extended position; and
    side wheels configured to rotatably couple to the base to enable the side wheels to apply the joint tape along a flat drywall joint when the arm is in the retracted position, the side wheels configured to rotatably couple to the base about a second axis that is parallel to and offset from the first axis.

16. The tool of claim 15, wherein the corner wheel is to extend beyond the side wheels when the arm is in the extended position.

17. The tool of claim 15, wherein the corner wheel is to extend away from the side wheels when the arm is in the retracted position.

18. A drywall banjo apparatus for applying joint tape, the drywall banjo apparatus comprising:
   a banjo body; and
   an applicator tool including:
      a base coupled to the banjo body;
      an arm including a proximal end and a distal end opposite the proximal end, the proximal end configured to rotatably couple to the base to enable the arm to rotate between an extended position and a retracted position, the arm configured to rotatably couple to the base about a first axis;
      a corner wheel configured to rotatably couple to the distal end of the arm to enable the corner wheel to apply the joint tape along a corner drywall joint when the arm is in the extended position; and
      side wheels configured to rotatably couple to the base, the side wheels configured to apply the joint tape along a flat drywall joint when the arm is in the retracted position, the side wheels configured to rotatably couple to the base about a second axis that is parallel to and offset from the first axis.

* * * * *